April 10, 1934.  M. E. LEWTER  1,954,361
MOTORCYCLE TOWING FRAME
Filed April 25, 1933
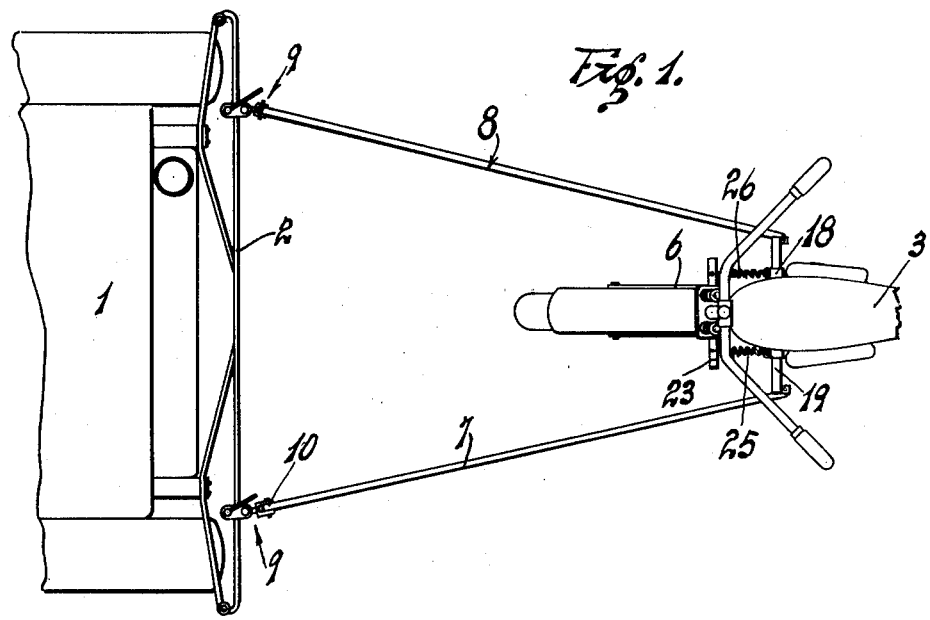
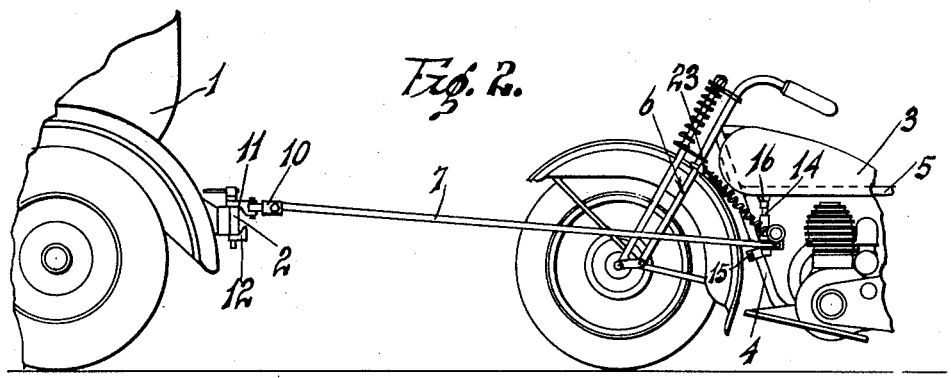
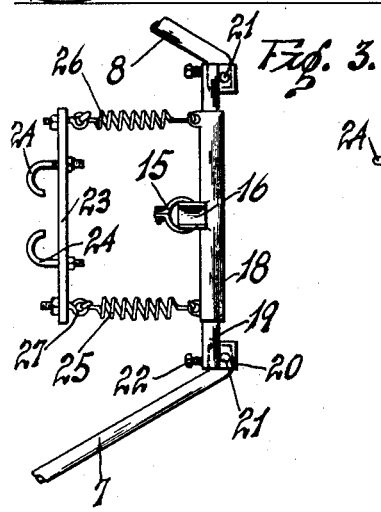
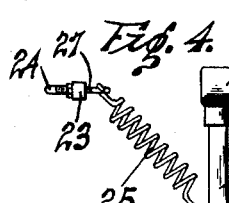
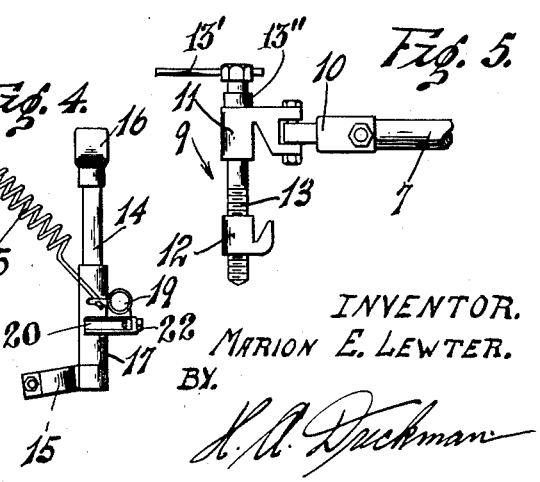
INVENTOR.
MARION E. LEWTER.
BY
ATTORNEY.

Patented Apr. 10, 1934

1,954,361

UNITED STATES PATENT OFFICE 1,954,361

MOTORCYCLE TOWING FRAME

Marion E. Lewter, Los Angeles, Calif.

Application April 25, 1933, Serial No. 667,797

9 Claims. (Cl. 208—27)

This invention relates to a motorcycle towing frame whereby a two-wheeled motorcycle can be towed behind an automobile.

An object of my invention is to provide a frame attachable to an automobile and to the motorcycle whereby the motorcycle will be held upright and will properly track behind the automobile when turning corners, and the like.

Another object is to provide a towing frame of the character stated which can be easily and quickly attached and detached from the automobile and which is readily foldable on the motorcycle so that it will not hamper the rider.

Another object is to provide a towing frame of the character stated which can be attached to present types of motorcycles, or which may be built as an integral part thereof.

An advantage of my frame resides in the ease with which the motorcycle can be attached to the bumper of an automobile without having to properly space the two vehicles apart. That is, the motorcycle can be easily moved towards or away from the rear of the automobile, and can easily be moved into upright position by means of one of the towing bars.

A further advantage is the absence of strain in any of the members of the towing frame while towing the motorcycle around corners, or over uneven ground.

In the drawing

Figure 1 is a plan view of my towing frame attached to an automobile and to a motorcycle.

Figure 2 is a side elevation of the same.

Figure 3 is a fragmentary plan view of the steering bar and the mounting pin.

Figure 4 is a side elevation of the same.

Figure 5 is a fragmentary side elevation of the bumper clamp.

Referring more particularly to the drawing, the numeral 1 indicates a vehicle, such as an automobile, and 2 is the rear bumper thereof. The numeral 3 indicates a motorcycle which is to be towed behind the automobile.

The motorcycle includes a front frame member 4 and a horizontal frame member 5. Front forks 6 are provided by means of which the motorcycle is guided. A pair of draw bars 7, 8 are each attached to clamps 9, 9 which are secured to the bumper 2. Clamps 9, 9 and bars 7 or 8 are secured together by a universal coupling 10. The clamps 9 include an upper notch member 11 which fits onto the top of the bumper and a shoe 12 which engages the bottom of the member.

A threaded bolt 13 extends thru the member 11 and screws into the shoe 12. By rotating the bolt through means of the arm 13', the member 11 and shoe 12 are drawn tightly against the top and the bottom of the bumper, thus securely attaching the draw bars to the automobile. A shoulder 13'' is formed on the bolt 13, which rests on the member 11, thereby limiting the upward movement of the said member.

A pivot pin 14 is mounted vertically between the frame members 4 and 5. A clamp 15 is attached to the lower end of the pin and encircles the frame member 4. A U-shaped fitting 16 is secured to the upper end of the pin 14 and partially encircles the frame member 5. By this means the pin is rigidly held in vertical position.

A sleeve 17 is journalled on the pin 14 and a tube 18 is fixedly attached thereto. The tube 18 extends horizontally and is preferably welded or integrally formed with the sleeve 17. A rod 19 extends thru the tube 18 and is journaled therein.

The draw bars 7, 8 are pivotally attached to the ends of the rod 19 in the following manner: A clip 20 is integrally formed or permamently attached to each end of the rod 19. The draw bars 7, 8 extend into these clips and are pivotally held therein by the pins 21. A set screw 22 extends into each of the clips and bears against the bent end of the draw bars 7, 8, thus controlling the angle of the draw bar in the clip, and preventing any lost motion at this point, and the set screws prevent any small movement between the draw bars and the rod 19 when going over rough roads, and also prevents wabbling of the motorcycle.

In going over uneven ground, the universal coupling 10 and the partial rotation of the rod 19 in the tube 18 eliminates any unusual strain on the parts of the towing frame. When the automobile turns a corner, the rod 19 will be swung around the pivot pin 14 and this movement is imparted to the front fork 6 of the motorcycle in the following manner: A guide bar 23 is fixedly attached to the front fork 6, preferably by means of hook bolts 24, 24.

A pair of coil springs 25, 26 are secured at one end to the tube 18 and at the other end to the guide bar 23. The springs are positioned one on either side of the pivot pin 14. The springs are each attached to an eye-bolt 27 which is adjustable in the bar 23.

Having described my invention, I claim:

1. A motorcycle towing frame whereby a motorcycle is towed behind a vehicle, said frame comprising a pair of draw bars, detachable means mounted on the forward end of the drawbars whereby they are secured to the vehicle, a rod, means pivotally mounting said rod on the motorcycle, and yieldable means attached to said rod and extending to the front forks of the motorcycle whereby the motorcycle is guided.

2. A motorcycle towing frame for towing a motorcycle behind a vehicle having a rear bumper, said frame comprising a pair of draw bars, a pair of clamps attachable to the bumper on each side of the vehicle, a universal coupling connecting each draw bar and a clamp, a rod, attaching means at each end of said rod whereby the draw bars are secured thereto, a pivot pin, means mounting said pivot pin on the motorcycle, means journaling said rod on the pin, and a pair of springs attached to said rod and extending to front forks of the motorcycle.

3. A motorcycle towing frame for towing a motorcycle behind a vehicle having a rear bumper, said frame comprising a pair of draw bars, a pair of clamps attachable to the bumper on each side of the vehicle, a universal coupling connecting each draw bar and a clamp, a rod, attaching means at each end of said rod whereby the draw bars are secured thereto, a pivot pin, means mounting said pivot pin on the motorcycle, means journaling said rod on the pin, a guide bar, means securing said bar to front forks of the motorcycle, and a spring attached to each end of said bar and mounted on said rod.

4. A motorcycle towing frame adapted to pull a motorcycle behind a vehicle having a bumper, said frame comprising a pair of draw bars, clamps attached to the bumper adjacent the outer ends thereof, universal couplings securing the draw bars to the clamps, a rod, a pivot pin, means mounting said pivot pin on the motorcycle, a sleeve journaled on the pivot pin, a tube attached to the sleeve, said rod extending thru the tube, and a spring attached to each end of the tube and to front forks of the motorcycle.

5. A motorcycle towing frame adapted to pull a motorcycle behind a vehicle having a bumper, said frame comprising a pair of draw bars, clamps attached to the bumper adjacent the outer ends thereof, universal couplings securing the draw bars to the clamps, a rod, a pivot pin, means mounting said pivot pin on the motorcycle, a sleeve journaled on the pivot pin, a tube attached to the sleeve, said rod extending thru the tube, a guide bar, means detachably securing the guide bar to front forks of the motorcycle, and a spring attached to each end of the guide bar and each end of the tube.

6. A motorcycle towing frame adapted to pull a motorcycle behind a vehicle having a bumper, said frame comprising a pair of draw bars, clamps attached to the bumper adjacent the outer ends thereof, universal couplings securing the draw bars to the clamps, a rod, a pivot pin, a clamp attached to the lower end of the pin, said clamp encircling a frame member of the motorcycle, a fitting secured to the upper end of the pin, said fitting bearing against a frame member of the motorcycle, a sleeve journaled on the pin, a horizontal tube on the sleeve, said rod extending thru the tube, means on the outer ends of the rod in which each draw bar is pivotally mounted, and a spring secured to the outer ends of the tube and to front forks of the motorcycle.

7. A motorcycle towing frame adapted to pull a motorcycle behind a vehicle having a bumper, said frame comprising a pair of draw bars, clamps attached to the bumper adjacent the outer ends thereof, universal couplings securing the draw bars to the clamps, a rod, a pivot pin, a clamp attached to the lower end of the pin, said clamp encircling a frame member of the motorcycle, a fitting secured to the upper end of the pin, said fitting bearing against a frame member of the motorcycle, a sleeve journaled on the pin, a horizontal tube on the sleeve, said rod extending thru the tube, a clip on each end of the rod, a pin extending thru the clip and thru the rear end of the draw bars whereby the draw bars are pivotally attached to the rod, a spring secured to each end of the tube and to front forks of the motorcycle.

8. A motorcycle towing frame adapted to pull a motorcycle behind a vehicle having a bumper, said frame comprising a pair of draw bars, clamps attached to the bumper adjacent the outer ends thereof, universal couplings securing the draw bars to the clamps, a rod, a pivot pin, a clamp attached to the lower end of the pin, said clamp encircling a frame member of the motorcycle, a fitting secured to the upper end of the pin, said fitting bearing against a frame member of the motorcycle, a sleeve journaled on the pin, a horizontal tube on the sleeve, said rod extending thru the clip and thru the rear end of the draw bars whereby the draw bars are pivotally attached to the rod, a guide bar, means detachably securing said guide bar to front forks of the motorcycle and a spring secured to the outer ends of the guide bar and the tube.

9. A motorcycle towing frame whereby a two-wheeled motorcycle is towed behind a vehicle including a rear bumper, said towing frame comprising a pair of clamps, upper and lower notched members on the clamp, a threaded bolt extending thru the upper notch member and threaded into the lower notched member, universal couplings on the upper notched member, a draw bar secured to each universal coupling, a pivot pin, means securing the pivot pin to the motorcycle, a rod, means journaling the rod on the pivot pin, attaching means on each end of the rod to which the rear ends of the draw bars are secured, and yieldable means extending from said rod to front forks of the motorcycle.

MARION E. LEWTER.